UNITED STATES PATENT OFFICE.

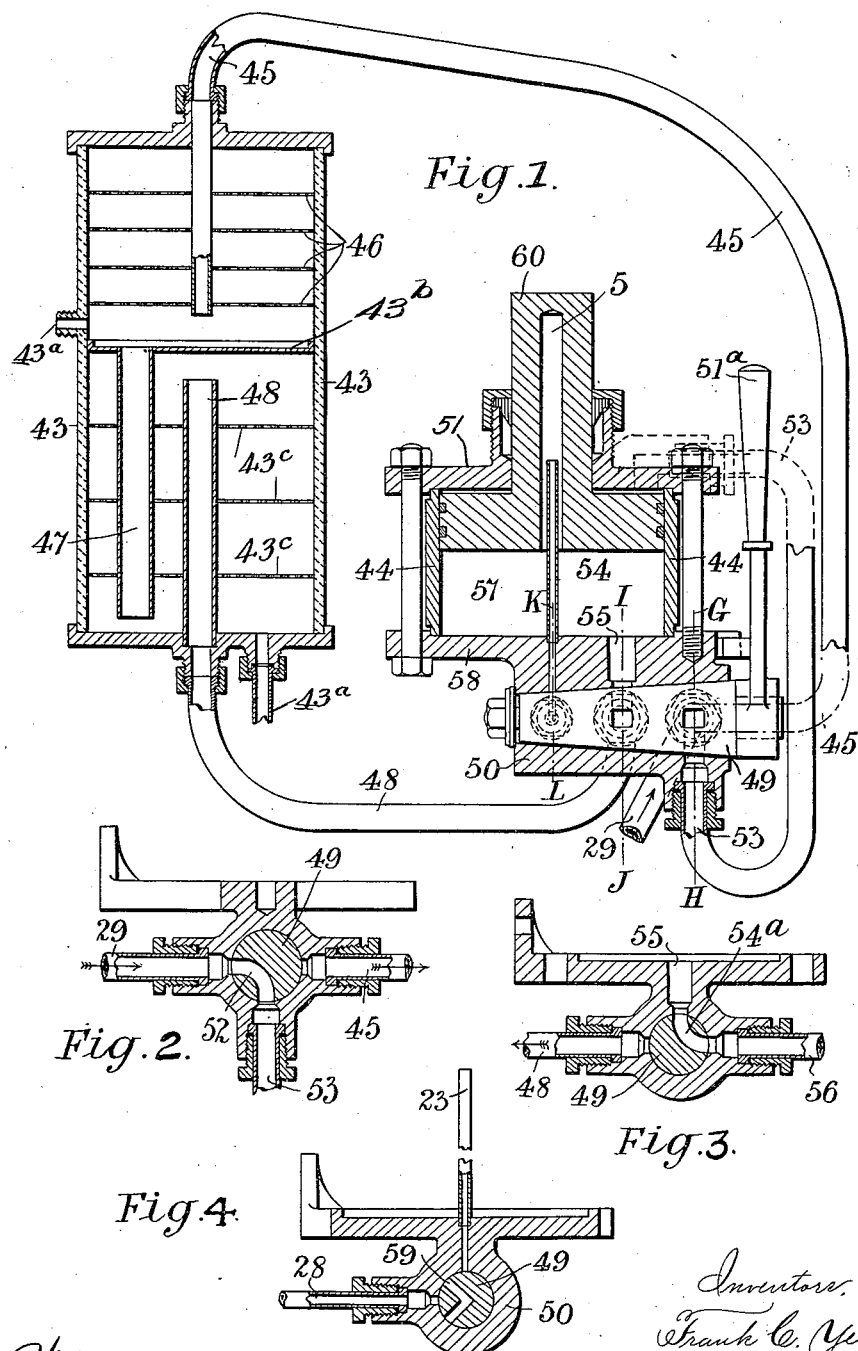

FRANK COREY YEO, OF DAN-Y-COED, NEAR SWANSEA, WALES, AND WYNYARD MONTAGU HALL AND THOMAS A. GOSKAR, OF WESTMINSTER, LONDON, ENGLAND.

APPARATUS FOR THE AERATION OF LIQUIDS.

1,086,972.  Specification of Letters Patent.  Patented Feb. 10, 1914.

Application filed November 22, 1909. Serial No. 529,440.

*To all whom it may concern:*

Be it known that we, FRANK COREY YEO, colliery proprietor, residing at Dan-y-coed, near Swansea, in the county of Glamorgan, Wales, and WYNYARD MONTAGU HALL, major, and THOMAS AUGUSTUS GOSKAR, engineer, residing at 47 Victoria street, Westminster, London, England, all subjects of the King of Great Britain, have invented certain new and useful Improvements in Apparatus for the Aeration of Liquids, of which the following is a specification.

The present invention relates to apparatus for the aeration of liquids, and means for delivering the same on draft when required.

The invention proposes to employ a pump of the reciprocating type, and a satuator connected to communicate therewith and in the operation of which the liquid from the source of supply is led to the pump, thence by the pump is forced into the saturator where it is aerated, thence from the saturator it is again led to the pump and from the pump is delivered to the point of discharge, as in the manner hereinafter described.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a central vertical sectional view, with parts in elevation, of the apparatus complete; Fig. 2 is a transverse sectional view of Fig. 1 taken on the line G—H thereof; Fig. 3 is a similar view taken on the line I—J of Fig. 1, and Fig. 4 is a like view taken on the line K—L of Fig. 1.

Referring to the construction in further detail, the same consists of a pump and a saturator, or carbonater, the pump adapted to be charged from the source of liquid supply, and to charge the saturator and in turn to be charged with aerated liquid from the saturator and dispense said liquid.

The pump comprises a cylinder 44 having a piston 54 reciprocating therein and providing a liquid receiving and a liquid discharging chamber. A valve 49 is mounted in a valve casing 50 formed integrally with the cylinder head 58, and is provided with a plurality of passages 52, 54ª and 59 adapted for effecting communication between the pump and the liquid supply, the pump and the saturator, and the pump and the delivery outlet, as will be hereinafter explained. The liquid or water supply pipe 29, communicating with a suitable reservoir, is connected to communicate with the pump receiving chamber (*i. e.* between the cylinder head 51 and piston 54) through the medium of the pipe 53 and the valve passageway 52, as illustrated in Fig. 2. The admission of water into the pump receiving chamber forces the piston or plunger 54 downwardly and this operation discharges the aerated liquid in the chamber 57 through the passageway 55 to the outlet or delivery pipe 56; said passageway and pipe having been brought into communication with the valve passageway 54ª, as shown in Fig. 3. When the valve 49 is further rotated, communication is cut off between the pipes 29 and 53, and the port or passage 52 is brought into communication with the pipes 45 and 53. This operation brings the receiving chamber of the pump into communication with the saturator 43. On the further rotation of the valve 49 communication is opened between the port 54ª, the passage 55 and the pipe 48, through which latter the aerated liquid is admitted from the saturator into the pump discharging chamber 57. The valve 49 is adapted, through the port 59, to effect communication between the pipe 23 and the snift discharge pipe 28 communicating with the atmosphere, to the end of relieving the pressure within the chamber 57 simultaneously with the charging of the pump with water, and the discharging of the aerated water therefrom. Said pipe 23 communicates with the chamber 57 through the passage 5 formed in the piston rod 60.

The saturator consists of a cylinder 43 provided with a partition 43ᵇ dividing the same into receiving and discharging chambers which are in communication through the medium of a pipe 47 secured to the partition plate 43ᵇ. Each of said chambers is provided with a plurality of screens, or perforated plates 46, to the end of breaking up the water and permitting of its intimate mixture with the gas which is admitted into the respective chambers of the saturator through the pipes 43ª. The saturator receiving chamber communicates with the pump receiving chamber through the medium of the pipe 45, and the saturator discharge chamber communicates with the pump discharge chamber through the medium of the pipe 48.

The operation of the apparatus is as follows: Assuming that the pump receiving chamber 57 is charged with aerated liquid from the saturator 43, and the handle 51ª of the valve is in the position shown in Fig. 1, communication is had between the saturator 43 and said chamber 57 through the port 54ª, so that the same quantity of aerated liquid in said chamber is maintained under the maximum gas pressure of the saturator. If now it is desired to draw off a drink, the lever 51ª is operated and the valve 49 thereby rotated with the result that communication is shut off between the pipe 48 and the chamber 57, and communication is also shut off between the pipes 45 and 53. Next, the snift pipe 23 and the passage 28 are brought into communication so that the gas pressure in the chamber 57 is relieved, and communication opened between the water supply pipe 29 and the pump receiving chamber through the pipe 53; and finally the discharge passage 55 is brought into communication with the discharge pipe 56 through the port 54ª. The several passages thus communicating, the major quantity in the chamber 57, or any portion thereof, may be dispensed, and in this operation the pump plunger or piston 54 will descend, and as it descends a corresponding supply of water enters the pump receiving chamber (i. e. the space between the piston 54 and cylinder head 51). As soon as the handle or lever 51ª is returned to its initial position, i. e. to its normally closed position, communication is broken between the passage 55 and the pipe 56, and between the pipes 29 and 53. The relief valve is also closed, and communication is opened between the pipes 53 and the pipe 45. Communication is also opened between the pipe 48 and the passage 55 whereupon the further supply of aerated liquid under pressure will enter the pump discharging chamber 57 from the saturator, and thereby force the piston 54 upwardly, discharging the supply of water from the pump receiving chamber through the pipes 53 and 45 and into the saturator; thus introducing a fresh supply of water into the latter corresponding to the amount of aerated liquid drawn off from the pump. It will thus be seen that each supply of liquid, water, etc., to be aerated is forced into the saturator (wholly or mainly) by means of the high pressure of gas employed in the saturator for aerating the liquid.

It will be noted that the pump receiving chamber is of less cross sectional area than the pump discharging chamber 57, by reason of the piston rod 60, with the result that the piston 54 may be raised through the pressure within the saturator transmitted through the pipe 48, against the saturator pressure within said pump receiving chamber transmitted through the pipes 45 and 53, which are brought into communication at the same time that the saturator communicates its pressure into the pump chamber 57. It will be further seen that the pump is initially charged under pressure of the liquid supply through the pipe 29, by reason of the saturator pressure within the chamber 57 being relieved through the medium of the snifting valve and the actual discharge of the aerated liquid; also that the saturator is charged from the pump through the medium of the saturator pressure.

It is obvious that those skilled in the art may vary the details of construction and arrangement of parts without departing from the spirit of our invention, and therefore we do not wish to be limited to such features except as may be required by the claims.

We claim:—

1. In liquid aerating and dispensing apparatus, the combination of a pump constructed to provide a liquid receiving and a discharging chamber of relatively different sizes, a saturator adapted to communicate with a source of gas supply under pressure, means for charging the pump from a source of liquid supply, means for simultaneously charging the saturator with liquid from the pump and charging the pump with aerated liquid from the saturator through the pressure in the saturator, and a controlling device for said means.

2. In liquid aerating and dispensing apparatus, the combination of a pump comprising a cylinder and a piston operable in the cylinder constructed to provide therewith a receiving chamber, and a discharging chamber of relatively greater cross sectional area, a saturator adapted to communicate with a source of gas supply under pressure, means for charging the receiving chamber of the pump with liquid and simultaneously relieving the pressure in and discharging the aerated liquid from the discharging chamber of the pump, means providing communication between the receiving chamber of the pump and the saturator, means for charging the pump discharging chamber with aerated liquid from the saturator against the pressure of the saturator in the pump receiving chamber, and a controlling device for said means.

3. In liquid aerating and dispensing apparatus, the combination of a pump providing a receiving and a discharging chamber; a saturator having means for communicating with a source of gas under pressure; means for admitting liquid to the pump; means for charging the saturator with liquid from the pump; means for charging the pump with aerated liquid from the saturator; and means for discharging the aerated liquid from the pump.

4. In liquid aerating and dispensing apparatus, the combination of a pump providing a receiving and a discharging chamber; a saturator having means for communicating with a source of gas supply under pressure; and means operable in succession for initially charging the pump with liquid, charging the saturator with the liquid from the pump, charging the pump with aerated liquid from the saturator and discharging the aerated liquid from the pump.

5. In liquid aerating and dispensing apparatus, the combination of a pump providing a receiving and a discharging chamber; a saturator adapted to communicate with a source of gas under pressure; a valve associated with the pump; and pipes associated with the valve and providing communications between the pump and saturator, said valve operable to effect in succession the initial charging of the pump with liquid, charging the saturator with liquid from the pump, charging the pump with aerated liquid from the saturator, and discharging the aerated liquid from the pump.

6. In liquid aerating and dispensing apparatus, the combination of a pump providing a receiving and a discharging chamber, a saturator providing a receiving and a communicating discharging chamber and adapted to communicate with a source of gas under pressure, a pipe adapted to communicate with the source of liquid supply, means providing communication between said supply pipe and the receiving chamber of the pump, means providing communication between the pump receiving chamber and the receiving chamber of the saturator, means providing communication between the discharging chamber of the saturator and the pump discharging chamber, a discharge pipe adapted to communicate with the pump discharging chamber, and means for selectively controlling all of said communicating means.

7. In liquid aerating and dispensing apparatus, the combination of a pump having a reciprocable piston providing a receiving and a discharging chamber, a saturator having a receiving chamber and a communicating discharging chamber and adapted to communicate with a source of gas supply under pressure, a valve mounted on the pump and provided with passages, a liquid supply pipe adapted to communicate with one of said valve passages, a pipe communicating with the receiving chamber of the pump and adapted to communicate with the supply pipe through said passage, pipes connecting the pump and saturator and adapted to communicate with the respective receiving and discharging chambers thereof through the valve passages and the pipe of the pump receiving chamber, said valve operable to effect in succession the initial charging of the pump with liquid, charging the saturator with liquid from the pump, charging the pump with aerated liquid from the saturator, and discharging the aerated liquid from the pump.

In witness whereof we have hereunto set our hands in presence of two witnesses.

F. COREY YEO.
W. MONTAGU HALL.
T. A. GOSKAR.

Witnesses:
CARL R. LOOP,
H. D. JAMESON.

Copies of this patent may be obtained for five cents each, by addressing the "Commissioner of Patents, Washington. D. C."